United States Patent
Shelton et al.

(10) Patent No.: US 8,808,141 B2
(45) Date of Patent: Aug. 19, 2014

(54) TORQUE HOLE FILLING IN A HYBRID VEHICLE DURING AUTOMATIC TRANSMISSION SHIFTING

(71) Applicant: Ford Global Technologies, LLC, Dearborn, MI (US)

(72) Inventors: Matthew John Shelton, Grosse Ile, MI (US); Christopher John Teslak, Plymouth, MI (US); Zhengyu Dai, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 13/834,976

(22) Filed: Mar. 15, 2013

(65) Prior Publication Data
US 2013/0296127 A1     Nov. 7, 2013

Related U.S. Application Data

(60) Provisional application No. 61/643,900, filed on May 7, 2012.

(51) Int. Cl.
| | | |
|---|---|---|
| *B60W 10/02* | (2006.01) | |
| *B60W 20/00* | (2006.01) | |
| *B60W 30/19* | (2012.01) | |
| *B60W 10/08* | (2006.01) | |
| *B60W 10/115* | (2012.01) | |
| *B60W 10/06* | (2006.01) | |
| *B60K 6/48* | (2007.10) | |
| *B60W 50/00* | (2006.01) | |

(52) U.S. Cl.
CPC ......... *B60W 20/10* (2013.01); *B60W 2510/244* (2013.01); *B60W 20/30* (2013.01); *B60W 30/19* (2013.01); *B60K 2006/4825* (2013.01); *B60W 2710/0666* (2013.01); *B60W 2710/1022* (2013.01); *B60W 20/00* (2013.01); *B60W 10/08* (2013.01); *B60W 10/115* (2013.01); *B60W 2510/1025* (2013.01); *Y10S 903/902* (2013.01); *B60W 10/06* (2013.01); *B60W 10/02* (2013.01); *B60W 2710/083* (2013.01); *B60W 2050/0008* (2013.01)
USPC ............................................... 477/5; 903/902

(58) Field of Classification Search
None
See application file for complete search history.

(56) References Cited

U.S. PATENT DOCUMENTS

| | | | | |
|---|---|---|---|---|
| 3,732,751 | A * | 5/1973 | Berman et al. ..................... 475/2 |
| 4,335,429 | A * | 6/1982 | Kawakatsu ................... 701/102 |
| 4,593,580 | A * | 6/1986 | Schulze ........................ 477/109 |
| 4,724,723 | A | 2/1988 | Lockhart et al. |
| 4,744,031 | A | 5/1988 | Takeda et al. |

(Continued)

FOREIGN PATENT DOCUMENTS

JP          05087227        4/1993

*Primary Examiner* — Dirk Wright
(74) *Attorney, Agent, or Firm* — David B. Kelley; Brooks Kushman P.C.

(57) ABSTRACT

A system and method for reducing torque disturbances during a shift event for a hybrid vehicle having an engine selectively coupled to a traction motor and an automatic transmission to control or compensate actual transmission input shaft torque based on measured transmission input torque by controlling a torque source, such as a traction motor. The system and method may include an engine, a transmission, a traction motor between the engine and the transmission with the engine being selectively coupled to the motor and the transmission by a disconnect clutch and a controller configured to control motor torque to cause an actual transmission input shaft torque to achieve a target transmission input shaft torque during a transmission shift event.

20 Claims, 3 Drawing Sheets

(56) References Cited

U.S. PATENT DOCUMENTS

| | | |
|---|---|---|
| 4,790,418 A | 12/1988 | Brown et al. |
| 4,792,902 A | 12/1988 | Hrovat et al. |
| 4,855,914 A | 8/1989 | Davis et al. |
| 5,058,015 A | 10/1991 | Leorat |
| 5,092,182 A | 3/1992 | Ikeda et al. |
| 5,105,357 A | 4/1992 | Steeby |
| 5,133,227 A | 7/1992 | Iwatsuki |
| 5,165,286 A | 11/1992 | Hamamura et al. |
| 5,188,005 A | 2/1993 | Sankpal et al. |
| 5,573,477 A | 11/1996 | Desautels et al. |
| 5,669,851 A | 9/1997 | Tietze |
| 5,743,828 A * | 4/1998 | Kuriyama et al. ............ 477/169 |
| 5,785,627 A * | 7/1998 | Uno et al. ..................... 477/109 |
| 5,839,987 A | 11/1998 | Sawamura et al. |
| 6,047,605 A | 4/2000 | Garshelis |
| 6,145,387 A | 11/2000 | Garshelis |
| 6,243,637 B1 | 6/2001 | Minowa et al. |
| 6,246,941 B1 | 6/2001 | Sayman |
| 6,260,423 B1 | 7/2001 | Garshelis |
| 6,278,926 B1 | 8/2001 | Jain et al. |
| 6,482,125 B2 | 11/2002 | Urasawa |
| 6,487,925 B2 | 12/2002 | Fischer et al. |
| 6,490,934 B2 | 12/2002 | Garshelis |
| 6,553,847 B2 | 4/2003 | Garshelis |
| 6,698,299 B2 | 3/2004 | Cripe |
| 6,846,260 B2 | 1/2005 | Horiuchi |
| 6,949,051 B2 | 9/2005 | Katakura |
| 6,969,340 B2 | 11/2005 | Tokura et al. |
| 6,991,584 B2 | 1/2006 | Cowan |
| 7,178,618 B2 | 2/2007 | Komeda et al. |
| 7,243,557 B2 | 7/2007 | May |
| 7,300,381 B2 | 11/2007 | Badillo et al. |
| 7,351,183 B2 | 4/2008 | Fujii et al. |
| 7,478,572 B2 | 1/2009 | Maten et al. |
| 7,503,875 B2 | 3/2009 | Fujii et al. |
| 8,290,668 B2 | 10/2012 | Hirasako et al. |
| 2002/0025885 A1 | 2/2002 | Saito et al. |
| 2004/0242374 A1 | 12/2004 | Wheals |
| 2006/0135316 A1 | 6/2006 | Fujii et al. |
| 2006/0154781 A1 | 7/2006 | Petzold et al. |
| 2008/0139362 A1 | 6/2008 | Fujii et al. |
| 2009/0171545 A1 | 7/2009 | Shimizu et al. |
| 2010/0292901 A1 | 11/2010 | Ortmann et al. |
| 2010/0318269 A1 | 12/2010 | Yanakiev et al. |
| 2011/0184612 A1 | 7/2011 | Fujii et al. |
| 2012/0101675 A1* | 4/2012 | Saito ............................... 701/22 |
| 2012/0130608 A1 | 5/2012 | Fujii et al. |
| 2012/0130610 A1 | 5/2012 | Lee et al. |

* cited by examiner

TORQUE HOLE FILLING IN A HYBRID VEHICLE DURING AUTOMATIC TRANSMISSION SHIFTING

CROSS-REFERENCE TO RELATED APPLICATIONS

This application claims the benefit of U.S. provisional Application No. 61/643,900 filed May 7, 2012, the disclosure of which is incorporated in its entirety by reference herein.

TECHNICAL FIELD

The present disclosure relates to shift control of a hybrid vehicle having an engine selectively coupled to a traction motor and an automatic transmission.

BACKGROUND

A multiple-ratio automatic transmission in an automotive vehicle powertrain utilizes multiple friction elements for automatic gear ratio shifting. In general, these friction elements may be described as torque establishing elements although more commonly they are referred to as clutches or brakes. The friction elements establish power flow paths from a torque source such as an internal combustion engine or a traction motor to vehicle traction wheels. During acceleration of the vehicle, the overall speed ratio, which is the ratio of a transmission input shaft speed to a transmission output shaft speed, is reduced as vehicle speed increases for a given accelerator pedal demand as the transmission upshifts through the various ratios.

In the case of a synchronous upshift, a first torque establishing element, referred to as an off-going clutch (OGC), is released while a second torque establishing element, referred to as an on-coming clutch (OCC), is engaged to lower a transmission gear ratio and change the torque flow path through the transmission. A typical upshift event is divided into a preparatory phase, a torque phase, and an inertia phase. During the preparatory phase, the OCC is stroked to prepare for its engagement while the OGC torque-holding capacity is reduced as a step toward its release. During the torque phase, which may be referred to as a torque transfer phase, the OGC torque is reduced toward a value of zero or a non-significant level to prepare it for disengagement. Simultaneously, the OCC torque is raised from a non-significant level, thereby initiating engagement of the OCC according to a conventional upshift control strategy. The timing of the OCC engagement and the OGC disengagement results in a momentary activation of two torque flow paths through the gearing, thereby causing torque delivery to drop momentarily at the transmission output shaft. This condition, which can be referred to as a "torque hole," occurs before disengagement of the OGC. A vehicle occupant can perceive a "torque hole" as an unpleasant shift shock. When the OCC develops enough torque, the OGC is released, marking the end of the torque phase and the beginning of the inertia phase. During the inertia phase, the OCC torque is adjusted to reduce its slip speed toward zero. When the OCC slip speed reaches zero, the shift event is completed.

Torque hole filling is the process by which the transmission control strategy attempts to reduce and/or eliminate the transmission output torque hole during an upshift event. Control strategies for reducing torque disturbances include providing an increase in transmission input torque during the torque phase of the upshift. The increase in transmission input torque must be synchronized with the OCC and OGC to deliver a consistent shift feel. Various techniques and/or strategies may be used to increase transmission input torque, such as, throttle and spark timing control of the engine. The throttle may be opened more than required to achieve driver demand torque and the spark may be retarded to maintain the same engine torque. This strategy creates a torque reserve where the engine can quickly provide more transmission input torque. However, there are various limitations associated with use of this approach; for example, external conditions (e.g., high altitude) may prevent the engine from creating the desired torque reserve, which would reduce the overall effectiveness of the torque hole filling strategy. As such, there is a need to provide a robust and systematic means to reduce torque disturbances transmitted from the powertrain to the vehicle body during an upshift event.

SUMMARY

A system and method for reducing torque disturbances during a shift event for a hybrid vehicle having an engine selectively coupled to a traction motor and an automatic transmission to control or compensate actual transmission input shaft torque based on measured transmission input torque, by controlling a torque source, such as motor torque. Embodiments of this disclosure may be used in various shift control applications where improvement in shift quality is desired.

In one embodiment, a hybrid vehicle includes an engine, a transmission having gearing defining multiple torque flow paths from an input shaft to an output shaft of the transmission and a traction motor disposed between the engine and the transmission, where the engine is selectively coupled to the motor and the transmission by a disconnect clutch. The hybrid vehicle also includes a controller configured to control motor torque to cause an actual transmission input shaft torque to achieve a target transmission input shaft torque during a transmission shift event.

In another embodiment, a method for controlling a hybrid vehicle having a traction motor disposed between an engine and a transmission, where the engine is selectively coupled to the motor and the transmission by a disconnect clutch, includes controlling motor torque to cause an actual transmission input shaft torque to achieve a target transmission input shaft torque during a transmission shift event. The method also includes detecting a start of a torque phase of the transmission shift event and controlling motor torque during the torque phase using closed-loop control based on measured transmission input shaft torque feedback. The method further includes increasing an engine torque reserve to a desired level when available motor torque is less than a desired transmission input shaft torque increase necessary to reduce a transmission output torque hole during the transmission shift event.

Embodiments according to the present disclosure provide various advantages. For example, various embodiments reduce torque disturbances transmitted from the powertrain to the vehicle body, which reduces the unpleasant shift shock experienced by drivers. Further, use of the traction motor as a primary source of transmission input torque may benefit fuel economy and emissions by reducing the amount of torque reserve needed to be created by using the engine.

The above advantages and other advantages and features will be readily apparent from the following detailed description of the preferred embodiments when taken in connection with the accompanying drawings.

DETAILED DESCRIPTION

As required, detailed embodiments of the claimed subject matter are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

Vehicle manufacturers are improving powertrain and driveline systems for hybrid vehicles to meet the demand for increased fuel efficiency and lower emissions. One such improvement may be referred to as a Modular Hybrid Transmission (MHT) vehicle design. In a MHT vehicle, a traction motor is disposed between an automatic transmission and an engine. The engine may be selectively coupled to the traction motor and the automatic transmission by a disconnect clutch. The disconnect clutch may allow the vehicle to operate in an electric-only drive mode with the traction motor acting as the primary power source (engine disconnected), in a hybrid mode with both the traction motor and the engine propelling the vehicle, and/or in an engine-only mode in which the vehicle is propelled by the engine alone.

Figure 1A:
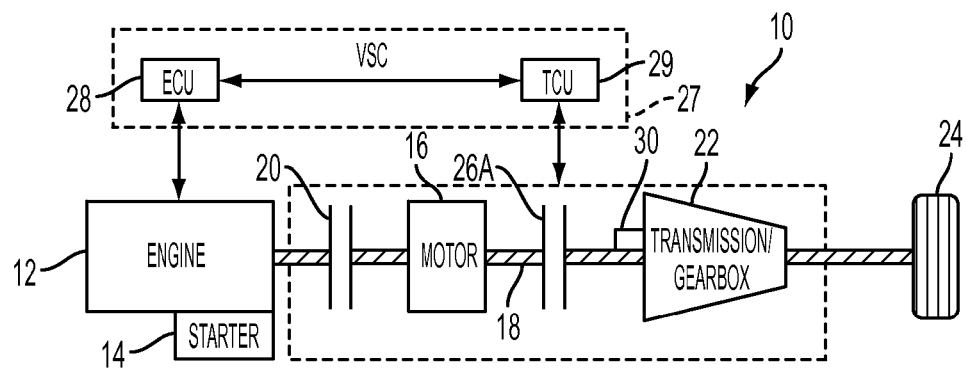
FIG. 1A is a schematic representation of a transmission system for a hybrid vehicle that does not include a torque converter in accordance with embodiments of the present disclosure.
Figure 1B:
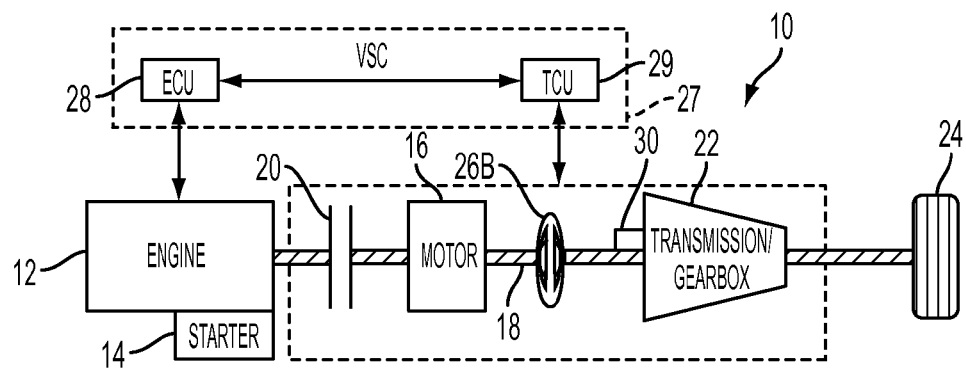
FIG. 1B is a schematic representation of a transmission system for a hybrid vehicle that does include a torque converter in accordance with embodiments of the present disclosure.

Referring to FIGS. 1A and 1B, a schematic representation of a MHT 10 is shown. An engine 12 may be operatively connected to a starter 14 that may be used to start the engine 12 when additional torque is needed. An electrical machine 16, or traction motor, may be operatively connected to a driveline 18 and positioned between the engine 12 and the transmission 22, or gear box. The engine 12 may be selectively coupled to the motor 16 and the transmission 22 by a disconnect clutch 20. Torque transmitted from the engine 12 and motor 16 may be provided through the driveline 18 to the transmission 22, which provides torque to drive the wheels 24.

As shown in FIG. 1A, a launch clutch 26A may be provided between the transmission 22 and the engine 12 and/or motor 16 to provide torque through the transmission 22 to the wheels 24. Likewise, as shown in FIG. 1B, a torque converter 26B may be provided between the transmission 22 and the engine 12 and/or motor 16 to provide torque through the transmission 22 to the wheels 24. While elimination of the torque converter is an advantage of the embodiment of FIG. 1A, the present disclosure is also advantageous in reducing vibrations in systems having a torque converter 26B like that shown in the embodiment of FIG. 1B.

The vehicle may include a controller 27, such as a vehicle system controller (VSC), for controlling various vehicle systems and subsystems. The controller 27 may include various types of computer readable storage media to implement volatile and/or persistent memory. Controller 27 is in communication with one or more sensors 30 and actuators (not shown). Sensor(s) 30 may be implemented by a torque sensor positioned to measure an input torque of transmission 22. Torque sensor 30 may be implemented by a strain-gauge based system, a piezoelectric load cell, or a magneto-elastic torque sensor as described in greater detail in U.S. Pat. Nos. 6,266,054; 6,145,387, 6,047,605; 6,553,847; and 6,490,934, for example, the disclosures of which are incorporated by reference in their entirety. The magneto-elastic torque sensor enables accurate measurements of torque exerted onto a rotating shaft without requiring a physical contact between a magnetic flux sensing element and the shaft. It should be understood that the torque sensor 30 can be positioned differently from that shown in FIGS. 1A and 1B depending on a kinematic arrangement and sensor packaging considerations for a given transmission system to implement upshift control methods according to various embodiments of the present disclosure.

In one embodiment, controller 27 is a VSC that includes an engine control unit (ECU) 28 and a transmission control unit (TCU) 29. The ECU 28 is electrically connected to the engine 12 for controlling the operation of the engine 12. The TCU 29 is electrically connected to and controls the motor 16 and the transmission 22. The ECU 28 is in communication with the TCU 29 and other controllers (not shown) over a vehicle network using a common bus protocol (e.g., CAN), in accordance with one or more embodiments of the present disclosure. Although the illustrated embodiment depicts the VSC 27 functionality for controlling the MHT powertrain as being contained within two controllers (ECU 28 and TCU 29), other embodiments of the hybrid vehicle may include a single VSC controller and/or any other combination of controllers for controlling the MHT powertrain.

The shifting of an automatic transmission is accompanied by applying and/or releasing multiple friction elements (such as plate clutches, band-brakes, etc.) that change speed and torque relationships by altering gear configurations. Friction elements may be actuated hydraulically, mechanically or through other strategies using one or more associated actuators that may be in communication with a microprocessor-based controller implementing a particular control strategy based on signals received from one or more sensors. A realizable combination of gear configurations determines a total number of ratio steps. Although various planetary and layshaft gear configurations are found in modern automatic transmissions, the basic principle of shift kinematics is similar.

During a typical synchronous upshift event from a lower gear configuration to a higher gear configuration, both the gear ratio (defined as automatic transmission input shaft speed/output shaft speed) and the torque ratio (defined as automatic transmission output shaft torque/input shaft torque) become lower. During the upshift event, a friction element (referred to as an off-going clutch (OGC)) associated with the lower gear configuration disengages while a different friction element (referred to as an on-coming clutch (OCC)) associated with a higher gear configuration engages.

Figure 2:
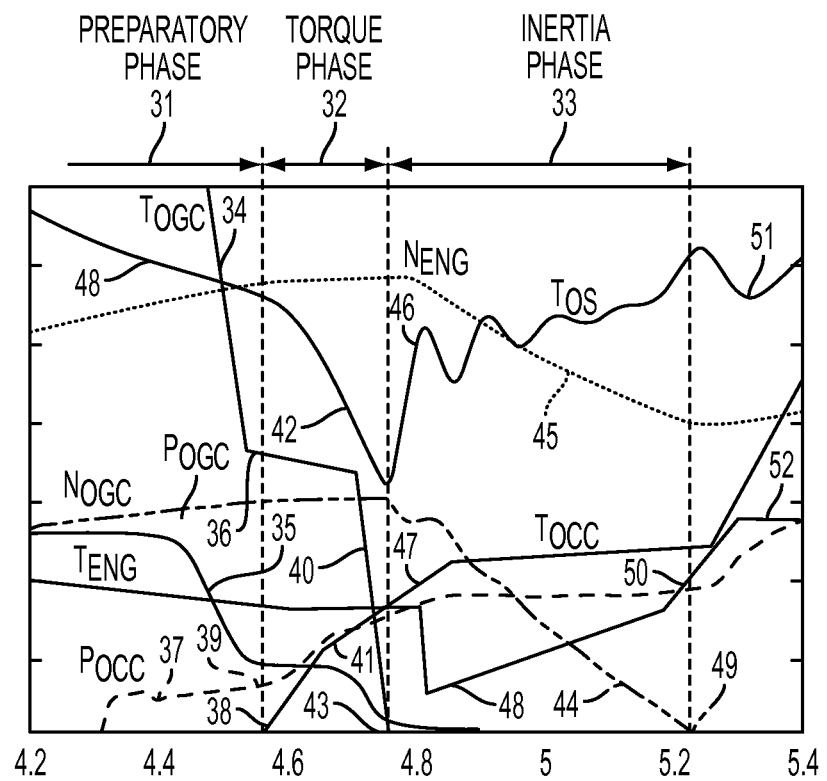
FIG. 2 illustrates a plot of a synchronous upshift event according to a prior art upshift control method for a conventional transmission.

Referring to FIG. 2, a plot of a synchronous upshift event according to a conventional upshift control method is shown. The synchronous upshift event of FIG. 2 is divided into three phases: preparatory phase 31, torque phase 32, and inertia phase 33. Torque phase 32 is a time period when torque capacity of OGC is controlled to decrease toward a value of zero for its disengagement. Preparatory phase 31 is a time period prior to torque phase 32. Inertia phase 33 is a time period when OGC starts to slip, following torque phase 32. During preparatory phase 31, the torque capacity of OGC is reduced, as shown at 34, by lowering hydraulic pressure ($P_{OGC}$) 35 applied to its actuator to prepare for its release. The OGC maintains enough torque capacity, however, to keep it from slipping at this time, as shown at 36. Simultaneously, OCC hydraulic control pressure ($P_{OCC}$) is increased at 37 to stroke OCC actuator, without assuming a significant torque capacity, to prepare for its engagement.

The torque phase 32 begins at an initial rise time ($t_{OCC}$) 38 when OCC torque capacity ($T_{OCC}$) starts rising. At the initial rise time, the OCC actuator may still be squeezing oil film between clutch plates with no detectable change in $P_{OCC}$ profile 39. This is because OCC can develop significant torque through viscous shear between clutch plates even before its actuator is fully stroked. It is known that this viscous torque is highly nonlinear with respect to $P_{OCC}$ due to a number of factors, such as the frictional characteristics of the clutch plates and transmission fluid, temperature, etc. Accordingly, it is difficult to accurately detect $t_{OCC}$ based on the measurements of $P_{OCC}$. During the torque phase 32, $T_{OGC}$ is further reduced 40 without slipping, maintaining the planetary gear set in the low gear configuration. However, the increasing $T_{OCC}$ 41 reduces net torque flow within the gear set. As a result, the output shaft torque ($T_{OS}$) drops significantly during the torque phase, creating the so-called torque hole 42. A large torque hole can be perceived by a vehicle occupant as an unpleasant shift shock or as sluggish powertrain performance.

The torque phase ends, hence the inertia phase begins, when OGC starts slipping at 43 (OGC slip not shown in the figure). Note that OGC may be allowed to slip before $T_{OGC}$ reaches zero at 43 if the load exerted onto OGC exceeds its torque-holding capacity $T_{OGC}$. During the inertia phase 33, OGC slip speed rises while OCC slip speed decreases toward zero 44. The engine speed drops 45 as the planetary gear configuration changes. During the inertia phase 33, the output shaft torque is primarily affected by $T_{OCC}$. This causes output shaft torque to rapidly move to the level 46 that corresponds to $T_{OCC}$ 47 at the beginning of the inertia phase.

FIG. 2 also shows reduced engine torque ($T_{ENG}$) 48 during the inertia phase. This is due to engine torque truncation by means of engine spark timing control according to a common practice in the conventional shift control method, enabling OCC to engage within a target time without requiring excessive torque capacity. When OCC completes engagement or when its slip speed becomes zero 49, the inertia phase 33 ends. The engine torque truncation is removed 50 and $T_{OS}$ moves to the level 51 that corresponds to a given engine torque level 52.

Figure 3:
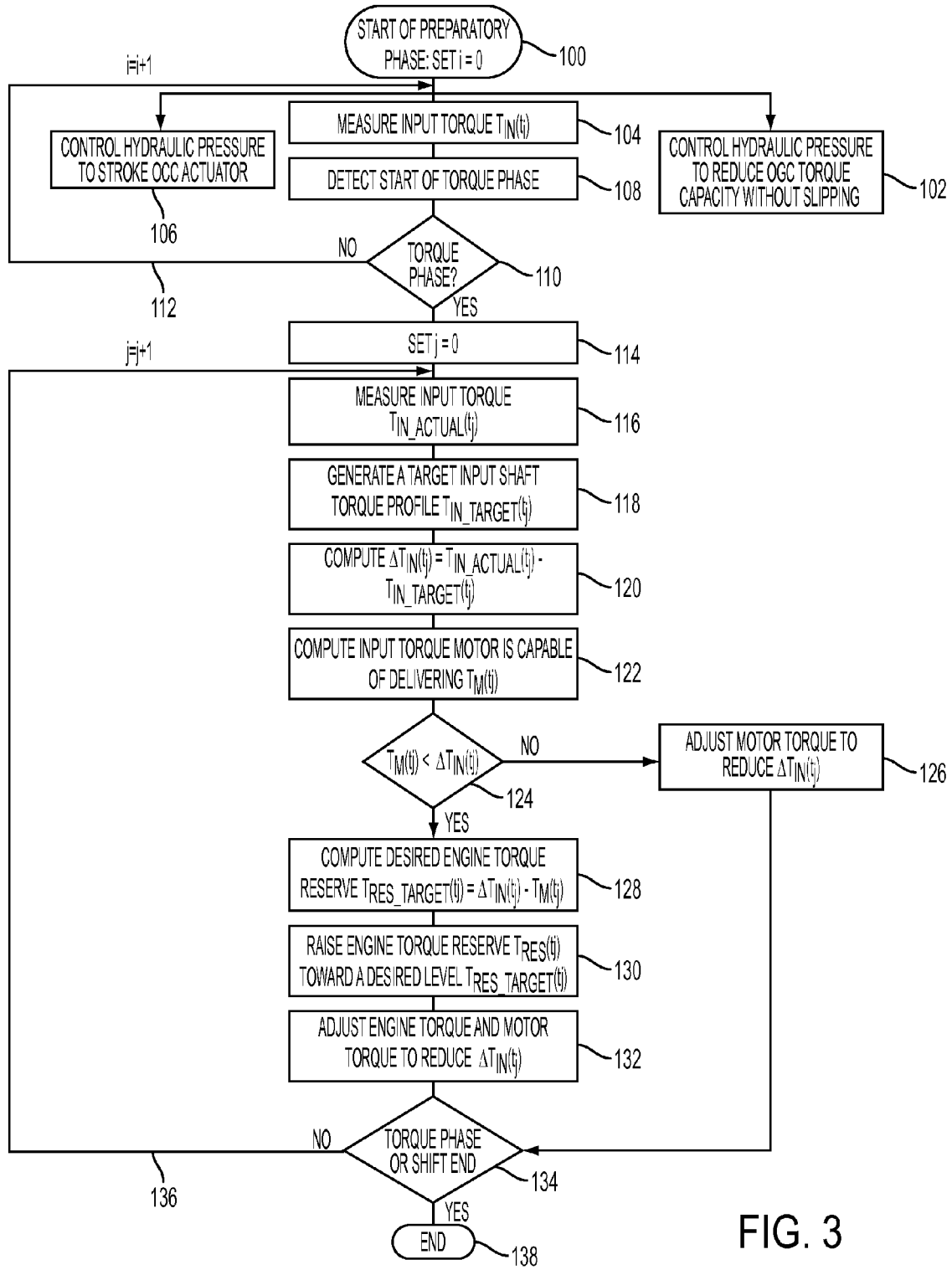
FIG. 3 illustrates a flowchart describing a control sequence operation of an upshift control system and/or method in accordance with an embodiment of the present disclosure.

Referring to FIG. 3, a flowchart illustrating operation of a system or method for controlling a hybrid vehicle during a shift event according to various embodiments of the present disclosure is shown. As those of ordinary skill in the art will understand, the functions represented in FIG. 3 may be performed by software and/or hardware depending on the particular application and implementation. The various functions may be performed in an order or sequence other than illustrated in FIG. 3 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of the vehicle.

More specifically, in FIG. 3, a powertrain controller initiates a shift event, which defines the start of the preparatory phase (i.e., setting i=0), as shown in block 100. The controller then prepares the OCC for engagement by raising hydraulic pressure ($P_{OCC}$) to the OCC actuator, as shown in block 106, while reducing OGC torque capacity without slipping as shown in block 102. Transmission input torque $T_{IN}(t_i)$ is then measured at control time step i or at time $t_i$, as shown in block 104. Measured transmission input shaft torque levels may be determined using various methods, such as, but not limited to, an input shaft torque signal produced by an input shaft torque sensor. By controlling actual transmission input torque, output shaft torque disturbance perceived by vehicle occupants may be eliminated or substantially reduced.

At blocks 108 and 110, the controller determines the end of the preparatory phase and the start of the torque phase. The controller iterates the control loop beginning from block 110 as shown at 112 until the preparatory phase ends and the torque phase begins. When the torque phase starts, the controller sets j=0 and measures the actual transmission input torque $T_{IN}(t_j)$ at control time step j or at time $t_j$ as shown in block 116. The controller then generates a target input shaft torque profile $T_{IN\_TARGET}(T_j)$ based on a desired output shaft torque profile using a speed ratio (e.g., input shaft speed/output shaft speed) as shown at 118. After generating the target input shaft torque profile, the controller computes the difference between the actual and the target input shaft torque ($\Delta T_{IN}(t_j)$ at control time $t_j$, as shown in block 120, which represents the desired transmission input torque increase. The controller then computes the input torque the motor is capable of delivering at time step j, $T_M(t_j)$, as shown at 122 and compares the available motor torque to the desired transmission input torque increase ($\Delta T_{IN}(t_j)$, as shown at 124.

The amount of transmission input torque the motor is capable of delivering in the desired timeframe may be determined from battery state-of-charge, current motor operating conditions and motor design details. If the available motor torque $T_M(t_j)$ is equal to or exceeds the desired transmission input torque increase ($\Delta T_{IN}(t_j)$, then the controller adjusts motor torque to reduce the difference between the actual and the target input shaft torque ($\Delta T_{IN}(t_j)$ as shown at 126. If the available motor torque $T_M(t_j)$ is less than the desired transmission input torque increase ($\Delta T_{IN}(t_j)$, then the controller computes a target engine torque reserve $T_{RES\_TARGET}(t_j)$ based on the difference between the available motor torque $T_M(t_j)$ and the desired transmission input torque increase ($\Delta T_{IN}(t_j)$ as shown at 128. The controller further raises current engine torque reserve toward the target engine torque reserve $T_{RES\_TARGET}(t_j)$. The controller then adjusts engine torque and motor torque in a synchronized manner to reduce the difference between the actual and the target input shaft torque ($\Delta T_{IN}(t_j)$. At block 134, the controller determines the end of torque phase. The controller iterates the control loop beginning from block 134 as shown at 136 until the torque phase or shift ends.

As such, embodiments according to the present disclosure reduce torque disturbances transmitted from the powertrain to the vehicle body, which reduces the unpleasant shift shock experienced by drivers. Use of the measured transmission input shaft torque signal facilitates coordinated torque phase control and inertia phase control of the OCC, OGC, and input torque source(s) in a synchronized manner during shifting to improve shift quality and consistency.

It is to be understood that the invention is not limited to the exact shift control methods which have been illustrated and discussed in this disclosure, but that various modifications may be made without departing from the spirit and the scope of the invention. It is to be understood that the invented method may be combined with a conventional shift control method for adjusting OCC clutch control parameters during the preparatory phase through a closed-loop, an open-loop or an adaptive scheme for balancing the reduction of torque disturbances with desired shift quality and drivability targets.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for controlling a hybrid vehicle having a traction motor disposed between an engine and a transmission, the engine being selectively coupled to the motor and the transmission by a disconnect clutch, comprising:
controlling motor torque to cause an actual transmission input shaft torque to achieve a target transmission input shaft torque during a transmission shift event.

2. The method of claim 1, further comprising:
controlling motor torque during a torque phase of the transmission shift event using closed-loop control based on measured transmission input shaft torque feedback.

3. The method of claim 1, further comprising:
increasing an engine torque reserve to a desired level when available motor torque is less than a desired transmission input shaft torque increase to reduce torque disturbances during the transmission shift event.

4. The method of claim 3, wherein the desired transmission input shaft torque increase is based on a difference between the actual transmission input shaft torque and the target transmission input shaft torque.

5. The method of claim 3, wherein the desired level of the engine torque reserve is based on a difference between available motor torque and the desired transmission input shaft torque increase.

6. The method of claim 3, wherein available motor torque is based on measured battery state-of-charge and current operating conditions of the motor.

7. The method of claim 3, further comprising:
coordinating control of engine torque and motor torque in a synchronized manner to cause the actual transmission input shaft torque to achieve the target transmission input shaft torque when available motor torque is less than the desired transmission input shaft torque increase.

8. The method of claim 1, wherein the actual transmission input shaft torque is measured from an input torque signal produced by a torque sensor.

9. The method of claim 1, further comprising:
increasing hydraulic pressure of an on-coming clutch (OCC) during a preparatory phase of the transmission shift event to prepare for engagement of the OCC;
reducing torque capacity of an off-going clutch (OGC) during the preparatory phase to prepare for disengagement of the OGC; and
synchronizing control of motor torque, the OCC and the OGC during a torque phase of the transmission shift event.

10. The method of claim 1, wherein the target transmission input shaft torque is based on a desired output shaft torque profile.

11. A hybrid vehicle, comprising:
an engine;
a transmission having gearing defining multiple torque flow paths from an input shaft to an output shaft of the transmission;
a traction motor disposed between the engine and the transmission, the engine being selectively coupled to the motor and the transmission by a disconnect clutch; and
a controller configured to control motor torque to cause an actual transmission input shaft torque to achieve a target transmission input shaft torque during a transmission shift event.

12. The hybrid vehicle of claim 11, wherein the controller is further configured to detect a start of a torque phase of the transmission shift event and control motor torque during the torque phase using closed-loop control based on measured transmission input shaft torque feedback.

13. The hybrid vehicle of claim 11, wherein the controller is further configured to increase an engine torque reserve to a desired level when available motor torque is less than a desired transmission input shaft torque increase necessary to reduce torque disturbances during the transmission shift event.

14. The hybrid vehicle of claim 13, wherein the desired transmission input shaft torque increase is based on a difference between the actual transmission input shaft torque and the target transmission input shaft torque.

15. The hybrid vehicle of claim 13, wherein the desired level of the engine torque reserve is based on a difference between available motor torque and the desired transmission input shaft torque increase.

16. The hybrid vehicle of claim 13, wherein available motor torque is based on measured battery state-of-charge and current operating conditions of the motor.

17. The hybrid vehicle of claim 13, wherein the controller is further configured to coordinate control of engine torque and motor torque in a synchronized manner to cause the actual transmission input shaft torque to achieve the target transmission input shaft torque when available motor torque is less than the desired transmission input shaft torque increase.

18. The hybrid vehicle of claim 11, wherein the actual transmission input shaft torque is measured from an input torque signal produced by a torque sensor coupled to the input shaft of the transmission.

19. The hybrid vehicle of claim 11, wherein the controller is further configured to increase hydraulic pressure of an on-coming clutch (OCC) during a preparatory phase of the transmission shift event to prepare for engagement of the OCC, reduce torque capacity of an off-going clutch (OGC) during the preparatory phase to prepare for disengagement of the OGC and synchronize control of motor torque, the OCC and the OGC during a torque phase of the transmission shift event.

20. The hybrid vehicle of claim 11, the target transmission input shaft torque is based on a desired output shaft torque profile.

\* \* \* \* \*